Jan. 28, 1941.  G. C. HANSEN  2,230,034
GUARD FOR A MILK PAIL
Filed March 17, 1939
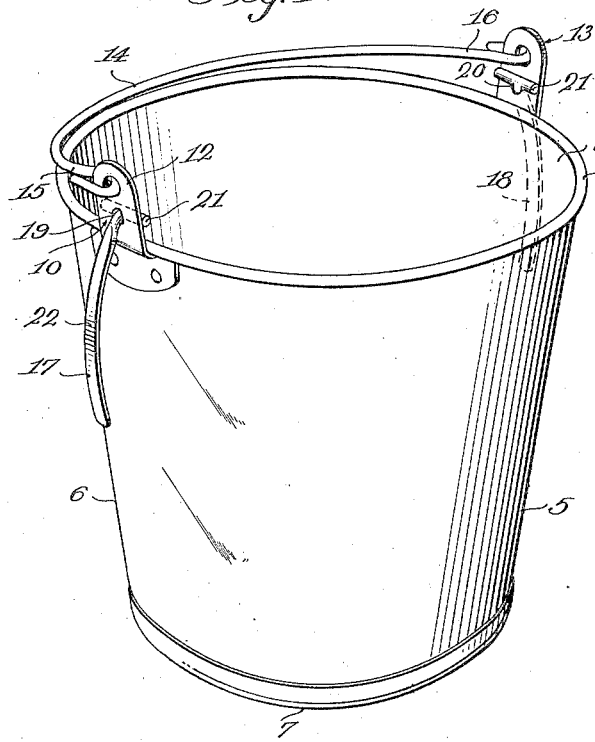
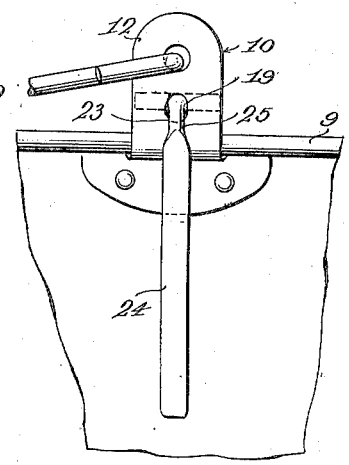
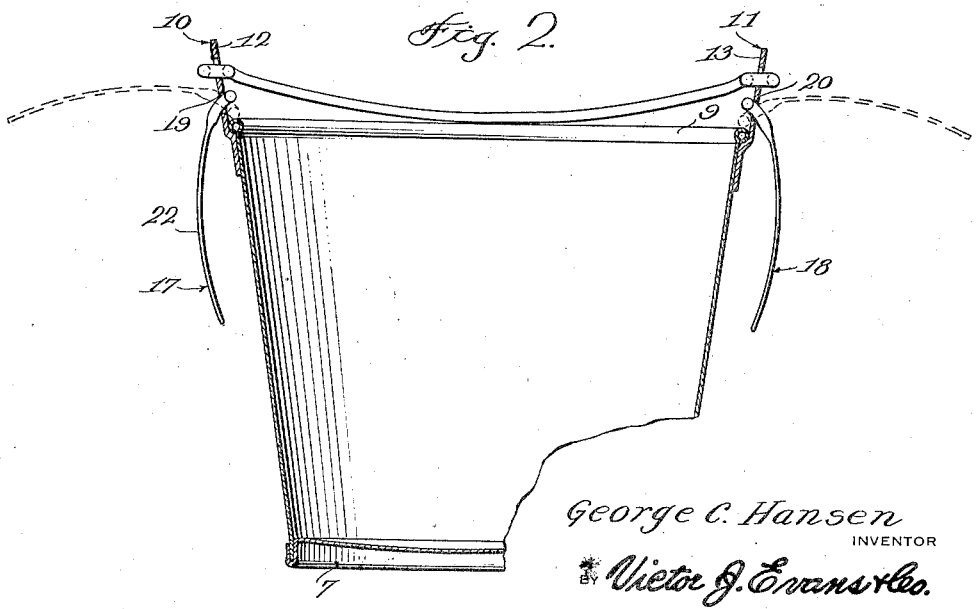
George C. Hansen
INVENTOR
BY Victor J. Evans & Co.
ATTORNEYS Patented Jan. 28, 1941

2,230,034

UNITED STATES PATENT OFFICE 2,230,034

GUARD FOR A MILK PAIL

George C. Hansen, Aurora, Wis.

Application March 17, 1939, Serial No. 262,525

2 Claims. (Cl. 31—54)

My invention relates to new and useful supporters for pails to be used in milking.

An important object of my invention is the provision of supporters for milk pails that will enable the milker to hold the pail close to the source of supply, and that will eliminate the necessity of tightly gripping the same between his knees.

Another object of my invention is the provision of supporters for milk pails that will rest on the milker's knees, thus relieving him of considerable fatigue.

Yet another object of my invention is the provision of supporters for milking pails that will automatically pivot to an unobstructive position when the pail is not in use.

Still another object of my invention is the provision of supporters for milk pails that are simple in construction, efficient in operation and inexpensive to manufacture.

Other objects and advantages of my invention will be apparent during the course of the following description.

In the drawing, forming a part of this specification, and in which like numerals are employed to designate like parts throughout the same, Figure 1 is a perspective view of a milking pail, and showing the supporters incorporated therewith, Fig. 2 is a vertical sectional view of the same, and Fig. 3 is a fragmentary side elevation thereof.

In the drawing, wherein for the purpose of illustration, is shown a preferred embodiment of my invention, the numeral 5 designates a pail of standard construction having a frusto-conical body portion 6, closed bottom 7 and an open top 8 which has an annular bead 9 extending circumferentially therearound. The handle supporters 10 and 11 are riveted, or otherwise secured, to the body portion 6 below the annular bead 9 and with the ears 12 and 13 extending upwardly a substantial distance above the said bead. A handle 14 is provided with its opposite ends 15 and 16 pivotally positioned in apertures adjacent the top of the ears 12 and 13.

The supporters 17 and 18, constituting my invention, are pivotally carried by the ears in the apertures 19 and 20 disposed vertically below and spaced from the handle receiving openings. The supporters 17 and 18 are substantially T-shaped in plan, and with the cylindrical head portions 21 disposed transversely of the ears 12 and 13 and normally maintained in appressed relation with the inner face thereof. The tail portions 22 of the supporters are slightly arcuated, as clearly illustrated in Fig. 2. The upper portions 23 of the said tail portions are integrally attached to the head portions 21 and are of substantially cylindrical formation, while the main length 24 thereof is flattened, as illustrated in Fig. 1. The flattened formation of the tail portions prevent the same from being longitudinally displaced through the openings 19 and 20 and permits the same to be comfortably supported by the knees 10 of a person engaged in milking.

When the supporters are in the operative position, the tail portions thereof are elevated to the position illustrated by the dotted lines in Fig. 2 in a manner whereby they extend laterally from the side of the pail and with the head portion 21 bearing against the top of the annular bead 9. The junctions of the flattened portions 24 with the cylindrical portions 23 of the tail portions will provide shoulders 25 which will engage with the upper peripheries of the openings 19 and 20, to aid the head portions 21 in supporting the pail.

It may be seen that the lateral positioning of the head portions 21 of the supporters will cause the same to rest upon the annular bead 9 for substantially their entire length, and that in so doing it will greatly steady the pail when held between the milker's knees, and will prevent the same from pivoting or swinging with respect thereto.

It is to be understood that the form of my invention herewith shown and described is to be taken as a preferred example of the same, and that various changes in the size, shape and arrangement of parts may be resorted to without departing from the spirit of my invention, or the scope of the appended claims.

Having thus described my invention, I claim:

1. In a pail of the type having an annular bead defining its upper edge, and a pair of diametrically opposed upwardly extending ears receiving the ends of the bail of the pail, each of said ears being provided with an aperture below its respective end of the bail but above the annular bead of the pail, the improvement comprising substantially T-shaped supporters pivotally received by the said apertures, the portion of the shanks of the supports adjacent the crosspieces thereof being rounded and extending through the apertures, and the extending end of the shanks being flattened to define shoulders at the juncture thereof with the rounded portion adapted to prevent displacement of the shanks inwardly of the pail, the said crosspieces of the supporters extending transversely of the inner faces of the ears and normally bearing thereagainst, outward actuation of the shanks acting to move the said crosspieces into engagement with the upper edge of the bead, which edge of the pail and the upper edges of apertures operate as fulcrum points for supporting the pail.

2. In a pail of the type having an annular bead defining its upper edge, and a pair of diametrically opposed upwardly extending ears receiving the ends of the bail of the pail, each of said ears being provided with an aperture below its respective end of the bail but above the annular bead of the pail, the improvement comprising substantially T-shaped supporters having the shank portions thereof pivotally received by the apertures, the portion of the shanks directly received by the apertures being rounded and of slightly lesser diameter than the said apertures, and the portion of the shanks extending beyond the said rounded portions being flattened, to readily accommodate themselves to the legs of the user and to define shoulders at the juncture thereof with the rounded portions adapted to prevent inward displacement of the shanks relative to the ears, upward movement of the shanks acting to position the crosspieces of the supporters in engagement with the top edge of the bead for their entire length whereby the pail will be exclusively supported by the engagement of the shoulders of the shanks with the upper edges of the apertures and the engagement of the crosspieces with the bead.

GEORGE C. HANSEN.